Feb. 14, 1933.　　　L. O. HEATH　　　1,897,376
APPARATUS FOR SPEED CONTROL
Filed Jan. 18, 1929　　　4 Sheets-Sheet 1
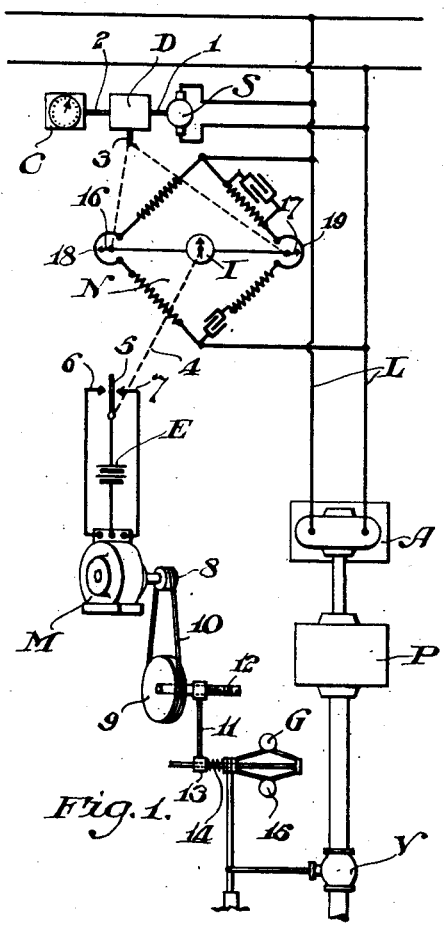
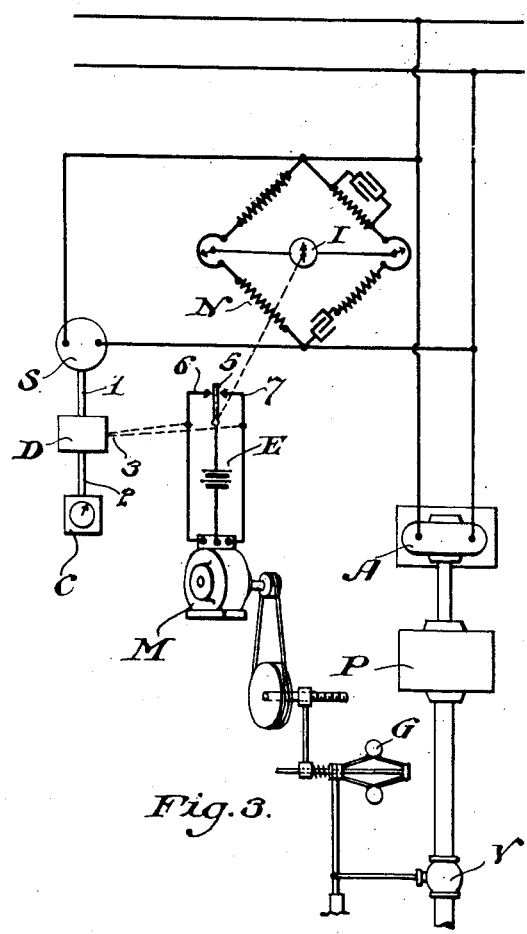
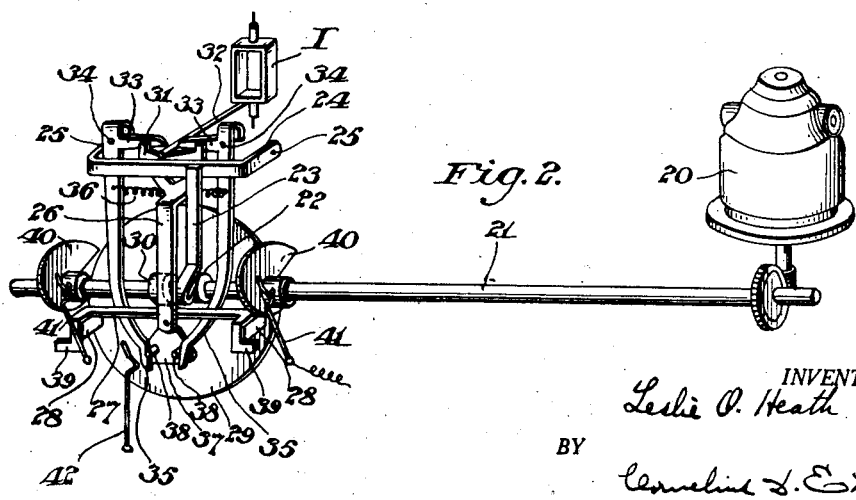
INVENTOR.
Leslie O. Heath
BY
his ATTORNEY.

Feb. 14, 1933.  L. O. HEATH  1,897,376
APPARATUS FOR SPEED CONTROL
Filed Jan. 18, 1929  4 Sheets-Sheet 2

INVENTOR.
Leslie O. Heath
BY Cornelius L. Ebret
his ATTORNEY.

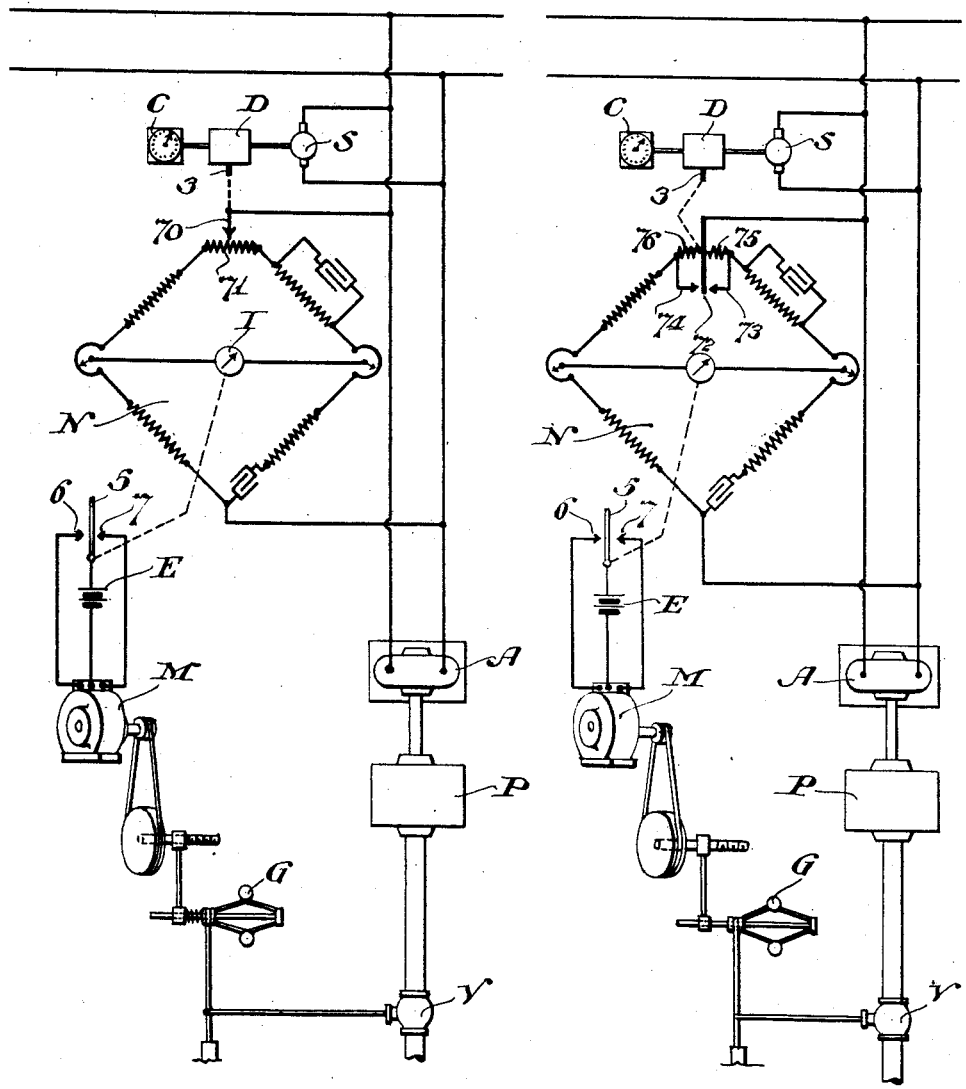

Feb. 14, 1933.  L. O. HEATH  1,897,376
APPARATUS FOR SPEED CONTROL
Filed Jan. 18, 1929   4 Sheets-Sheet 4

INVENTOR.
Leslie O. Heath
BY
    Cornelius L. Estes
        his ATTORNEY.

Patented Feb. 14, 1933

1,897,376

UNITED STATES PATENT OFFICE

LESLIE O. HEATH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

APPARATUS FOR SPEED CONTROL

Application filed January 18, 1929. Serial No. 333,330.

REISSUED

My invention relates to a method of and apparatus for controlling a condition or magnitude of a condition, as speed or frequency, particularly of electric generating systems.

In the exercise of my invention a control is effected jointly by, or in accordance with, effects produced respectively by, or in accordance with, an instantaneous value, specifically an instantaneous departure from a standard or predetermined magnitude, and by, or in accordance with, an integrated value, specifically an integrated departure from the standard or predetermined magnitude.

More particularly, the motive-energy supplied to a prime mover, as a turbine, driving for example a generator, specifically an alternator, is controlled jointly in accordance with the instantaneous difference between the actual frequency of alternating current and a desired frequency, and the integrated difference between the average frequency and the desired frequency.

My invention resides in the methods and apparatus hereinafter described and claimed.

For an understanding of my invention and of some of the various forms it may take, reference is to be had to the accompanying drawings, in which:

Fig. 1 diagrammatically illustrates one form of my invention as utilized to control an electrical generating unit.

Fig. 2 is a perspective view of a controller mechanism adapted to be used in the system shown in Fig. 1.

Fig. 3 illustrates in diagrammatic form another embodiment of my invention.

Figs. 6, 7 and 8 show diagrammatically other forms of my invention.

Figure 4:
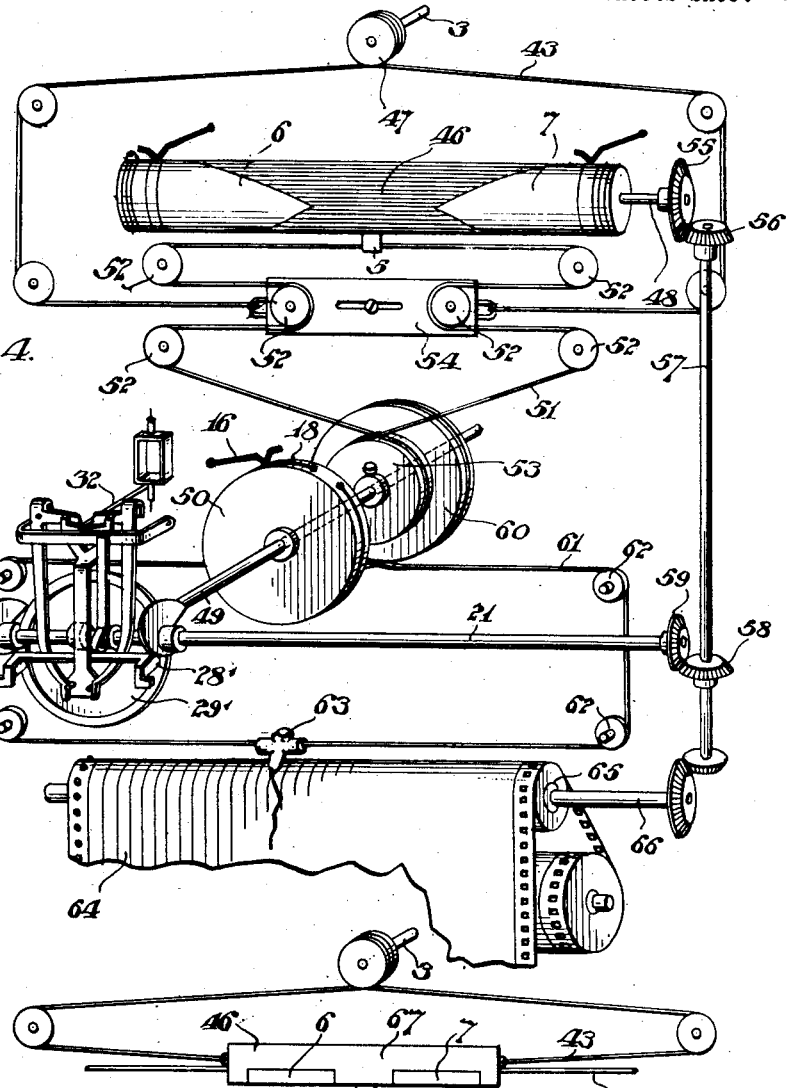
Figs. 4 and 5 are perspective views of controller-recorder mechanisms adapted for use in the system of Fig. 3.

Referring to the drawings, in Fig. 1 the alternator A supplying electrical energy to the line L is driven by a prime mover P, for example a turbine, whose speed is controlled in accordance with position of the valve V by any suitable governor mechanism G. A synchronous motor S drives one shaft 1 of differential gearing D, of any suitable type, having a second shaft 2 rotated at a constant speed, by suitable chronometric mechanism C. Difference in speed of rotation of the shafts 1 and 2 as effected, for example, by change in frequency of the alternator A due to change in load upon line L, or other cause, effects rotation of shaft 3 of the differential gearing D in one direction or the other depending upon the sense of change of speed of shaft 2 with respect to shaft 1, which movement is utilized as hereinafter described.

A balanced network N, for example, a frequency responsive Wheatstone bridge of the type described and claimed in co-pending Wunsch application Serial No. 18,794, filed March 27, 1925, is connected between the output conductors of alternator A. When the frequency of the alternator A is of the desired or predetermined value, the network of bridge N is balanced and there is no flow of current through the deflecting instrument I. Upon increase or decrease of frequency, the bridge is unbalanced and there is flow of current through the galvanometer I in a direction depending upon the sense of change. Movement of the movable structure of the galvanometer is communicated by suitable mechanical connections generically indicated by the dotted shaft 4, to the movable contact member 5 of a reversing switch controlling the energization and direction of rotation of the motor M. Accordingly as the instrument I deflects to the right or left, depending upon the sense of change of frequency, the movable contact member 5 engages either fixed contacts 6 or 7 completing a circuit from a suitable source E through motor M, to effect rotation thereof in a sense changing the setting of the governor G, through a suitable mechanical arrangement, to increase or decrease the energy supplied to the prime mover P in a sense and to an extent tending to restore the speed of the alternator A and therefore its frequency, to the desired or predetermined value.

In the example illustrated, the mechanism for communicating movement of the rotatable structure of the motor M to the operating mechanism of the valve V comprises speed-reducing mechanism generically represented by the pulleys 8, 9 and belt 10, operable to advance the member 11 along the threaded shaft 12, changing the position of the abutment 13, with the resultant variation of the tension of the spring 14 which opposes the flyball structure 15 of the governor G driven by the turbine or prime mover P with consequent change in speed and frequency.

When the speed of the prime mover P is governed solely by the frequency of the alternator A, although it is possible to maintain very slight difference between the actual and desired frequency, it is characteristic that the average frequency will be either higher or lower than the desired frequency. To maintain the average frequency substantially constant and to prevent more than slight, instantaneous departure from the average frequency, movement of shaft 3 which is representative of the integrated departure of the frequency from a standard or desired frequency, is utilized to affect the balance of the bridge N as by effecting movement of the contacts 16 and 17 along slide wires 18 and 19. In this modification of my invention, the direction and magnitude of current to the instrument I is determined both by the instantaneous departure and integrated departure of frequency of the current generated by alternator A from a standard frequency represented by the speed of rotation of the clock-driven shaft 2.

In Fig. 2 there is disclosed one form of suitable mechanism adapted for use in the system above described to effect control of the motor M in response to deflections of instrument I. An electric motor 20 or other suitable source of power rotates at a substantially constant speed a shaft 21 having thereon, or to which is attached, a cam 22 which engages the depending arm 23 of a U-shaped member 24 pivoted by points 25. A lever 26 is pivoted at its upper end on a horizontal axis and has pivoted thereto on a horizontal axis at its lower end the arm 27, on each end of which is a shoe 28 of metal or the like, frictionally engaging a fixed metal disc 29. Secured upon the shaft 21 is a cam 30, which periodically engages the lever 26 and moves it outwardly, in opposition to a spring, not shown, thereby lifting the shoes 28 from disc or plate 29, the spring returning the shoes into engagement with the disc after predetermined rotation of cam 30. Upon the member 24 is secured element 31, whose upper edge is inclined outwardly from the center. Disposed immediately above the upper, inclined edge of member 31 is the needle or pointer 32 of the deflecting instrument I. Directly above needle 32 and beneath which it normally freely swings are the members 33, 33 pivoted at 34, 34, and extending toward each other, leaving a gap of sufficient width between their inner ends for free entry of the pointer 32 when in balanced or zero position, corresponding with a balance of the Wheatstone bridge N of Fig. 1.

The needle 32 normally swings freely between the upper edge of member 31 and the members 33, 33, which latter have the downwardly extending arms 35, 35, biased toward each other by spring 36. Attached to the lower end of the arm or lever 26 is a triangular plate 37 carrying the pins 38, 38, cooperating with the lower ends of the arms 35, 35. At opposite ends of the arm 27 are the lugs 39, 39, adapted to be engaged by the cams 40, 40, similar in shape and similarly positioned and secured upon the shaft 21. The cams 40, 40 are of suitable conducting material and are insulated from the shaft 21. Suitable contact brushes 41, 41 are in constant electrical engagement with cams 40, 40, and a third brush 42 is in constant electrical engagement with disc 29 and therethrough with arm 27, which corresponds to the movable switch member 5 of Fig. 1, the cams 40, 40 corresponding to the contacts 6 and 7 of the reversing switch. When the galvanometer pointer 32 is in its central position due to balanced condition of the bridge N, neither of cams 40 engage lugs 39 and the motor M remains de-energized. As the galvanometer needle 32 deflects in one direction or the other, the arm 27 is rotated in one or the other direction bringing a lug 39, corresponding to either contact 6 or 7 of Fig. 1, into the path of movement of a cam 40 by which it is engaged and moved to its original position, the extent of movement and therefore the duration of mechanical and electrical contact between the members 40 and 39 being determined by the extent of deflection of the instrument I and unbalance of bridge N.

In this modification of my invention shown in Fig. 3 deflection of the instrument I and movement of the contact 5 is effected solely in accordance with change of frequency. To effect the desired control in accordance with both the instantaneous and integrated departure of frequency, movement of the differential shaft 3 is communicated to contact structure of the reversing switch controlling energization of motor M. For example, in Fig. 4, a cord 43 or equivalent, whose ends are connected to reciprocable carriage 54 passes over a pulley 47 secured to shaft 3 so that upon rotation thereof the carriage 54 is displaced longitudinally of cylinder 46, to change the relation between the contacts 6 and 7 carried thereby and contact 5. In the control mechanism of this figure the disc 29' engaged by cork shoes 28' of arm 27 is secured to the rotatable shaft 49 on which is mounted slide wire discs 50, one of which carrying the slide wire 18 engaged by the fixed contact 16, is shown. Upon deflection of the pointer 32, plate 29' and slide wire discs 50 are rotated, the bridge eventually coming to a balance at a new position of the contacts 16 and 17 along slide wires 18 and 19. A cord 51 connected to contact 5 and passing over the idler pulleys 52 engages the periphery or a groove of pulley 53 secured to control shaft 49 to transmit motion thereof to contact 5 effecting its movement toward or into engagement with either of contacts 6 and 7.

Movement of carriage 54 effects change in position of contact 5 without movement of the portion of belt or cord 51 extending between the lower pair of pulleys 52 and encircling pulley 53 secured to shaft 49, as is more fully explained in co-pending Doyle application Serial No. 284,370, filed June 11, 1928. The position of contact 5 in this modified control apparatus is, at any given time determined by magnitude and sense of departure of the instantaneous departure and of the integrated departure of the condition controlled, as frequency, from a standard at that time. Alternatively as suggested by the arrangement of Fig. 5, contact 5 may be moved solely by rotation of controller shaft 49 and the position of contacts 6 and 7 controlled by reciprocation of cylinder 46 on shaft 48 by cord 43.

Rotation of cylinder 46 and of contacts 6 and 7 shown as having increasingly greater circumferential extent as the distance from the center of the cylinder is increased, is effected in any suitable manner, as for example, by driving engagement between bevel gear 55 secured to shaft 48 and bevel gear 56 secured to shaft 57 driven from shaft 21 by another pair of gears 58, 59 secured respectively to shafts 57 and 21. Duration of engagement between contact 5 and either of contacts 6 or 7 as effected by relative movement of the contacts in accordance with change in instantaneous frequency and/or change in average frequency, is increasingly great as the contact 5 approaches the end of the cylinder 46 on which the contact 6 or 7 is mounted. Accordingly the periods of energization of the motor M and the extent of movement of the abutment 13 controlling the governor setting is greater as the algebraic sum of the departure of instantaneous and average frequency from the desired frequency is greater and vice versa.

To the shaft 49 there is also attached a pulley 60 engaged by a cord 61 or equivalent which passes over the idler pulleys 62 and moves a pen or stylus 63 across the surface of recorder sheet 64 in accordance with rotation of shaft 49 as deflected by change of instantaneous frequency. The recorder sheet 64 is provided with perforations engaging the abutment projecting from the surface of a cylinder 65 mounted on shaft 66 driven from shaft 57.

Figure 5:
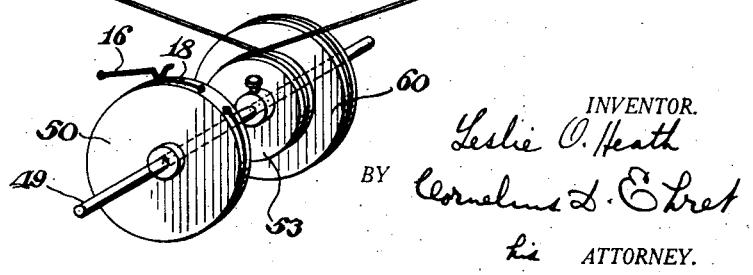

In Fig. 5 there is disclosed modified control mechanism in which the contacts 6 and 7 are mounted on a member 67 which is longitudinally displaced upon rotation of the differential shaft 3 by the cord 43. If desired, rotation of shaft 49 may be communicated to a stylus to record instantaneous frequency by mechanism similar or equivalent to that shown in Fig. 4.

In the modification of my invention shown in Fig. 6 movement of the differential shaft 3 effects movement of contact 70 along a resistance 71 included in the bridge, to vary calibration thereof. The frequency at which the bridge is balanced is varied within suitable limits by shifting of contact 70 to vary the proportion between the portions of resistance 71 included in the upper arms of the bridge N. Accordingly, the governor setting is changed to vary the speed of alternator A at which the bridge is balanced. With this modification, the mechanism may be of the controller or recorder-controller type for example, as shown in Fig. 4 or 5.

In Fig. 7 there is a further modified form of my invention, generally similar to that shown in Fig. 6 and in which movement of the differential shaft 3 moves a contact 72 into engagement with either of fixed contacts 73 or 74 to shunt either of resistances 75 or 76 included in adjacent arms of the bridge N suitably to change the calibration thereof to an extent, which is, however, preferably not great enough to substantially impair the accuracy of the record traced by the recorder pen 63, if used.

Figure 8:
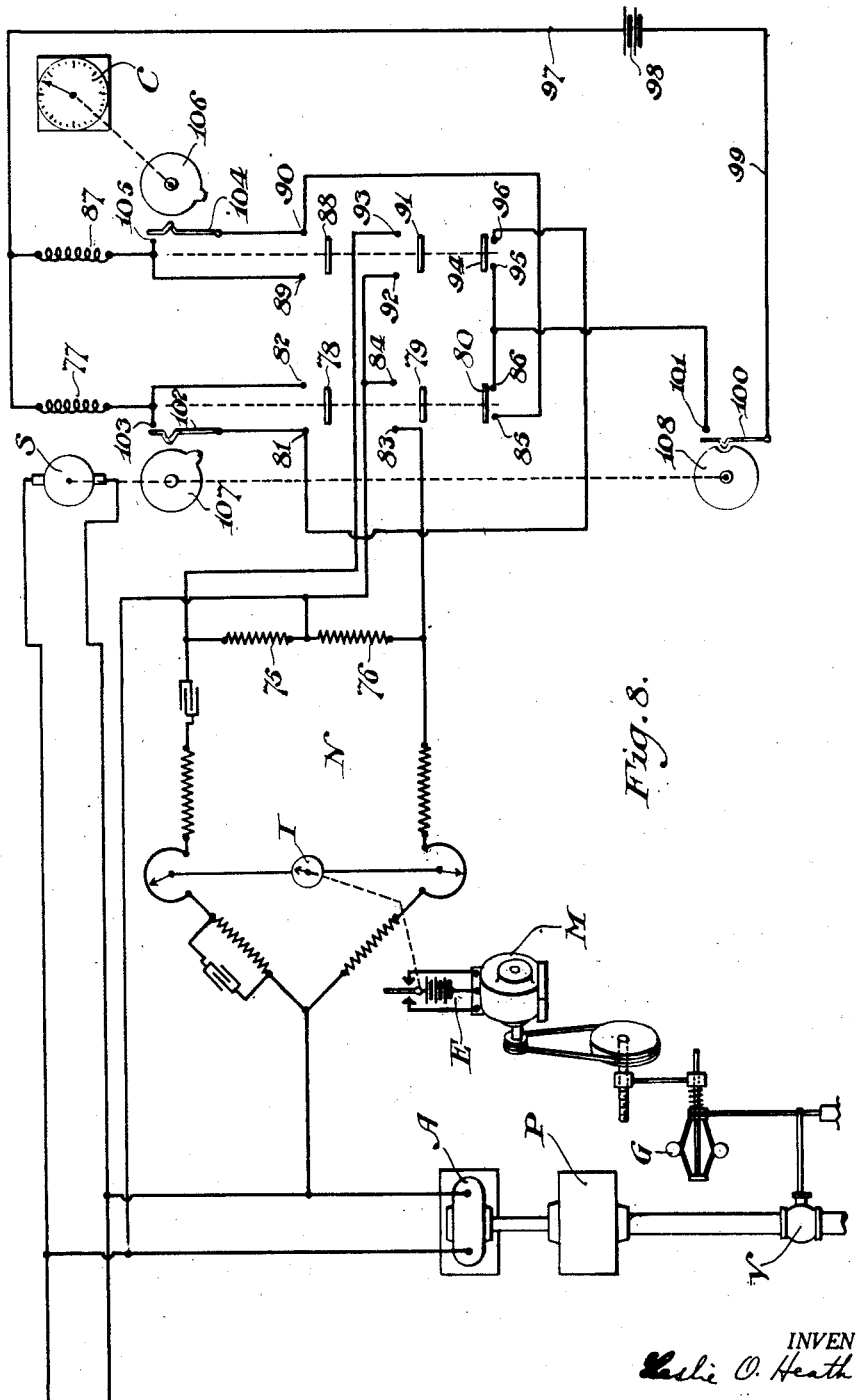

The bridge circuit shown in Fig. 8 is similar to that shown in Fig. 7 in that there is included the resistances 75 and 76 adapted to be shunted to change the calibration of the bridge. With the solenoid or electromagnet 77, there is associated movable armature structure not shown, mechanically connected to the bridging contact members 78, 79 and 80. Energization of the electromagnet as hereinafter described effects upward movement of contact 78 to bridge the fixed contacts 81 and 82, upward movement of contact 79 to engage contacts 83 and 84, and movement of contact member 80 to break away from contacts 85 and 86. Similarly, energization of the solenoid or electromagnet 87 effects movement of a bridging contact 88 into engagement with fixed contacts 89 and 90, engagement between movable bridging contact member 91 and fixed contacts 92 and 93, and movement of bridging contact member 94 from fixed contacts 95 and 96. A conductor 97 from one terminal of a suitable source of current 98 is connected to the upper ends of solenoids 77 and 87 and a conductor 99 from the other terminal thereof is connected to the contacts 86 and 95 through a movable contact member 100 adapted to engage fixed contact 101. Included in a conductor between the opposite end of solenoid 77 and contact 96 is a movable contact 102 adapted to engage a fixed contact 103 and similarly in a conductor between the lower end of solenoid 87 and contact 85 is included a switch member 104 adapted to engage a fixed contact 105. A cam 106 driven from the chronometric mechanism C, or equivalent, periodically moves the movable switch member 104 into engagement with fixed contact 105, for example at intervals of one minute, and a cam 107 rotatable with the shaft of the synchronous motor S periodically forces the movable contact member 102 into engagement with the fixed contact 103.

If the cam 106 engages the movable contacts 104 prior to engagement of cam 107 with movable contact member 102, solenoid 87 is energized and moves the contact member 94 out of engagement with contacts 95 and 96 and prevents the solenoid 77 from being energized upon subsequent engagement between contacts 102 and 103 as effected by cam 107. The switch member 88 is caused to bridge the contacts 89 and 90 so that upon separation of contacts 104 and 105 as the cam 106 continues to rotate, the circuit through solenoid 87 is maintained. During the period of energization of the solenoid 87 the bridging contact 91 engages fixed contacts 92 and 93 to shunt the resistance 75 of the network N to effect a change in calibration of the bridge as above described. The circuit through the solenoid is broken by separation of the contacts 100 and 101 after a suitable interval of time, as for example, approximately one minute, which occurs when a depression in the cam 108 driven from the synchronous motor S comes opposite the co-operating portion of the switch member 100 whereupon bridging contacts 88, 91 and 94 resume their original positions. Similarly upon increase of average frequency the cam 107 engages the movable contact member 102 before the cam 106 driven by the standard mechanism C engages the movable contact 104 engaging the solenoid 77 and, as above described, effecting upward movement of contact members 78, 79 and 80. The separation of contact members 80, 85 and 86 effects a discontinuity of the circuit of solenoid 87 so that upon subsequent engagement of the switch member 104 by cam 106 the solenoid 87 remains de-energized. Engagement of bridging contact 78 and contacts 81 and 82 completes a holding circuit which maintains the solenoid 77 energized, despite continued movement of cam 107 and consequent separation of contacts 102 and 103. During the energization of solenoid 77, the movable contact member 79 in engagement with fixed contacts 83 and 84 shunts the resistance 76 of the bridge N to change the bridge calibration. After a suitable interval, the flow of current through the solenoid 77 is broken by movement of the bridge member 100 as previously described.

Recorder mechanism such, as for example of the type shown in Fig. 4 may be utilized in this system to record frequency of the alternator A or line frequency.

While I prefer to change the setting of the governor G, indirectly to effect the settings or positions of valve V, it will be understood that the motor M, through suitable gear reduction or equivalent, may directly actuate the valve. Furthermore my invention is not limited to the control of speed or frequency but may be utilized to control any condition or characteristic by the use of suitable instruments responsive to instantaneous and integrated departures of the condition or characteristic from a desired standard or to the instantaneous and integrated values thereof, which co-operate jointly to effect a control.

What I claim is:

1. A control system comprising a balanced network, means to effect unbalance of said network in a sense determined by the sense of instantaneous departure from a standard, means to effect unbalance of said network in a sense corresponding to the sense of integrated departure from said standard, and a control member movable in response to unbalance of said network.

2. A control system comprising a balanced network, a control member movable in response to unbalance of said network, means to effect unbalance of said network in a sense and to an extent determined by the sense of instantaneous departure from a standard, means to effect unbalance of said network in a sense and to an extent corresponding to the sense and extent of integrated departure from said standard, and a control member movable in response to unbalance of said network.

3. A control system comprising a balanced network, a member movable in response to unbalance of said network, structure co-operating therewith to effect control, means to effect unbalance of said network in a sense determined by the sense of instantaneous departure from a standard, and means varying the relation of said member and structure in a sense corresponding to the sense of integrated departure from said standard.

4. A control system comprising a balanced network, a member movable in response to unbalance of said network, structure co-operating therewith to effect control, means to effect unbalance of said network in a sense and to an extent determined by the sense and extent of instantaneous departure from a standard, and means varying the relation of said member and structure in a sense and to an extent corresponding to the sense and extent of integrated departure from said standard.

5. A control system comprising a balanced network, means to effect unbalance of said network in a sense determined by the sense of instantaneous departure from a standard, and means intermittently operative to effect unbalance of said network in a sense corresponding to the sense of integrated departure from said standard, said means jointly effecting a control.

6. A frequency control system comprising a balanced network unbalanced by departure of instantaneous frequency from a standard frequency in a sense determined by the sense of said departure, means to effect unbalance of said network in a sense corresponding to the sense of integrated departure from said standard frequency, and a frequency-controlling member movable in response to unbalance of the network.

7. A frequency control system comprising an alternating current Wheatstone bridge, means responsive to unbalance of said bridge for controlling frequency, means for impressing a frequency to be controlled upon said bridge to effect unbalance thereof upon instantaneous departure from a standard frequency, and means to effect unbalance of said network in a sense corresponding to the sense of integrated departure from said standard frequency.

8. A frequency control system comprising members adapted to cooperate to effect control of frequency, means responsive to departure of instantaneous frequency from a standard including an alternating current Wheatstone bridge, and means responsive to integrated departure of frequency from a standard, said means jointly determining the control relation of said members.

9. In an arrangement comprising an alternator, a prime mover and a governor, a system for controlling the alternator frequency comprising members adapted to cooperate to effect change of governor setting, an alternating current Wheatstone bridge unbalanced upon departure of instantaneous frequency from a standard, and means responsive to integrated departure of frequency determining jointly with said Wheatstone bridge the control relation of said members.

10. In an arrangement comprising an alternator, a prime mover and a governor, a system for controlling the alternator frequency comprising an electro-mechanical system including a Wheatstone bridge unbalanced for instantaneous and integrated departure of frequency from a standard, and means associated with said system actuated in accordance with unbalance thereof for changing the governor setting.

11. A frequency control system comprising an alternating current Wheatstone bridge, means responsive to unbalance of said bridge for controlling frequency, means for impressing a frequency to be controlled upon said bridge to effect unbalance thereof upon instantaneous departure from a standard frequency, structure movable to vary the ratio between arms of said bridge, and means responsive to the integrated departure of the frequency from standard for moving said structure to unbalance said bridge.

12. In an arrangement comprising an alternator, a prime mover, a governor therefor, and an electric motor for changing the governor setting, a control system for said motor comprising a reversing switch including a rotatable structure having contacts increasing in area from a neutral zone, a contact adapted selectively to engage said contacts, and means to effect movement of said contact to and from said neutral zone comprising a differential system between a standard clock and a synchronous motor driven from said alternator.

13. A system comprising an alternator, a prime mover, a governor therefor, a reversible motor for changing the governor setting, and means for changing the governor setting by steps substantially proportional to the departure of the instantaneous and integrated frequency from standard comprising mechanism for effecting energization of said motor, means responsive to the departure of the instantaneous and integrated frequency from standard, and means controlled by said responsive means and controlling said mechanism to effect intermittent energization of said motor in a sense determined by the sense of departure of frequency from standard and for periods whose duration is substantially proportional to the departure.

14. A system comprising an alternator, a prime mover therefor, a governor for said prime mover, an electric motor for changing the governor setting, and means for changing the governor setting by steps substantially proportional to the departure of the instantaneous and integrated frequency from standard comprising a reversing switch for effecting energization of said motor, means responsive to the departure of the instantaneous and integrated frequency from standard, and means controlled by said responsive means for controlling the sense of actuation of said switch in accordance with the sense of the departure and for periods whose duration is substantially proportional to the departure.

LESLIE O. HEATH.